July 10, 1962 H. RUGGEBERG 3,042,994
ROTARY FILES
Filed May 4, 1960
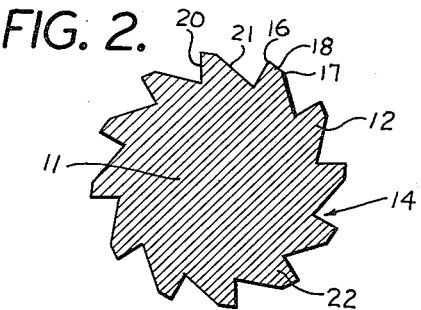
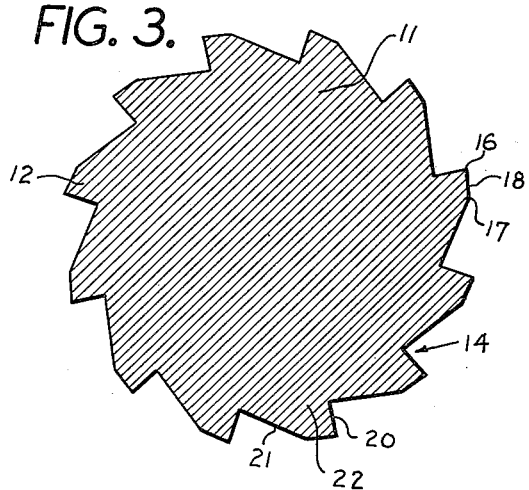
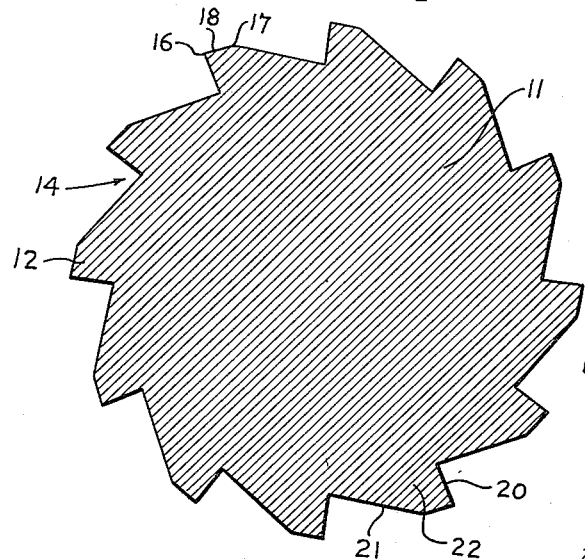
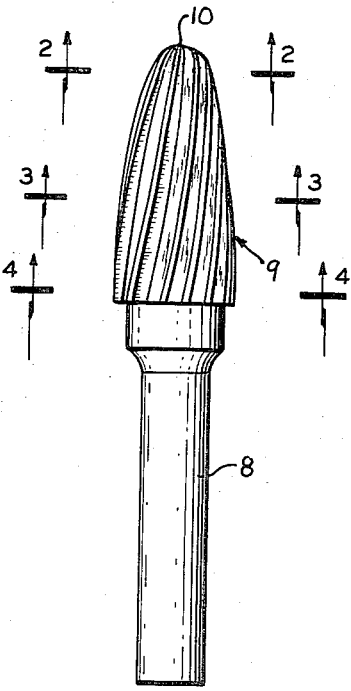
INVENTOR
HANS RUGGEBERG
ATTORNEYS.

United States Patent Office 3,042,994
Patented July 10, 1962

3,042,994
ROTARY FILES
Hans Ruggeberg, Marienheide, Rhineland, Germany, assignor to R. & R. Carbide Mfg. Co. Inc., Carlstadt, N.J., a corporation of New Jersey
Filed May 4, 1960, Ser. No. 26,808
1 Claim. (Cl. 29—78)

This invention relates to power-driven hand tools for abrading metal and aims to provide an improved rotary file.

Rotary files (sometimes also called burs) are used extensively by tool makers, die sinkers, pattern makers, and casting engineers for finishing operations and for the removel of metal, particularly burrs and fins. They are especially useful in cases where it is desired to remove metal from places that are hard to get at as, for instance, when it is desired to enlarge a hole or elongate a slot.

The rotary files that have been used prior to my invention have been provided with closely-spaced cutting teeth of triangular cross-section. Such tools have been subject to distinct limitations in use. They overheat quickly, are incapable of taking a deep bite in metal, and, even when the metal they remove is in the form of comparatively small chips, those chips tend to clog the flutes between the teeth. The consequence has been that the production rate of past rotary files has been severely limited.

Previous efforts have been made to alleviate the difficulties encountered in the use of conventional rotary files but they have been unsuccessful. For instance, attempts have been made to increase the bite in such rotary files by increasing the spaces separating the cutting teeth without sacrificing the cutting angle of the teeth. Such attempts have been defeated by the inherent weakness of the cutting tooth structure in conventional rotary files.

I have discovered that it is possible to effect a startling increase in the production rate of a rotary file of any given size by drastically altering the profile, and simultaneously reducing the number, of its teeth. My new rotary files not only remove metal at a faster rate than conventional rotary files, but they are also less subject to overheating and they require less power to operate. Furthermore, they can be operated at speeds very much higher than the operating speeds of conventional rotary files.

In the rotary files embodying my invention, the head terminates in a tip of reduced diameter and has a series of curved teeth extending from its inner end to its tip. Each of those teeth has a cutting edge, a trailing edge and a land. The width of the land varies; it is wide at the inner end of the head and tapers as it approaches the tip of the head. Furthermore, the land is disposed between the cutting and trailing edges at a non-uniform relief angle. That relief angle is smallest at the largest diameter of the head and largest at the smallest diameter of the head. As a result, the trailing edge of each tooth extends along a helicoidal line.

It is a particular feature of my invention that it provides a rotary file construction that permits full advantage to be taken of the valuable properties of tungsten carbide as a cutting material. Rotary files embodying my invention, when made of this material, can operate at a production rate far in excess of that of conventional rotary files and throughout a productive life that is many times that of conventional files. Furthermore, the necessity for resharpening the cutting edges of the teeth is drastically reduced.

It is a further feature of my invention that my cutting teeth are highest, and the flutes between adjacent cutting teeth are largest, at the maximum diameter of the cutting head. As a result, the point at which the teeth take their deepest bite and produce the largest chips is the point at which heat is most rapidly dissipated and larger chips are best handled without clogging the flutes.

A rotary file embodying my invention in the form which I now prefer is illustrated in the accompanying drawings in which:

FIG. 1 is an elevational view of the rotary file; and
FIGS. 2, 3 and 4 are enlarged sections taken, respectively, along the lines 2—2, 3—3, and 4—4 of FIG. 1.

The rotary file illustrated in the drawing includes a shaft 8 and a head, indicated generally by reference numeral 9, that terminates in a tip 10 of reduced diameter. The head 9, which is preferably constructed of tungsten carbide, includes a body 11 and teeth 12. The series of flutes 14, which are located between adjacent teeth, are of such size and shape that, even when the file is used upon stringy, ductile material, undue chip-loading or clogging is prevented.

Each tooth 12 has a cutting edge 16, a trailing edge 17 and a land 18 which is disposed between the cutting and trailing edges at a relief angle (the angle between land 18 and a line tangent to the head at cutting edge 16) that may range from at least about 2° at the largest diameter of head 9 to about 7° at the smallest diameter of that head. Each tooth also has a face 20 and a back 21 that extends from its land 18 to the body 11 at a point adjacent the inner end of the face 20 of the following tooth to provide a broad strong base 22. This rugged construction permits tooth face 20 to extend from the cutting edge 16 to the body 11 at a rake angle which, in conjunction with the relief accorded to land 18 and sloping back 21, ensures greater stock removal and faster elimination of chips than was possible with rotary files of conventional construction.

While the relative dimension of the face 20, back 21 and land 18 of a tooth, and their angular relationships, can be varied appreciably without departing from my invention as it is defined in the appended claim, the following features, which are illustrated somewhat diagrammatically in the drawing, serve to characterize my invention: The land 18 tapers from a wide dimension at the maximum diameter of head 9 toward the tip 10. The relief angle of land 18, which is smallest at the maximum diameter of the head 9, increases toward the tip 10 to preserve the optimum cutting angle through the maintenance of the appropriate relationship between the relief angle and the spacing between adjacent flutes 14. The face 20 is longest, and tooth 12 is highest, at the maximum diameter of head 9. The flute 14 is largest at the maximum diameter of head 9 and decrease in size toward the tip 10.

What I claim is:
A rotary file comprising a shaft and a head terminat- ing in a tip of reduced diameter, said head having a series of teeth extending from its inner end to said tip along curved lines, each of said teeth having a cutting edge, a trailing edge and a land tapering toward said tip and disposed between said edges at a non-uniform relief angle whose size is smallest at the largest diameter of the head and largest at the smallest diameter of said head so that said trailing edge extends along a helicoidal line and uniform action is maintained throughout the length of said head.

References Cited in the file of this patent
UNITED STATES PATENTS

| | | |
|---|---|---|
| 2,070,730 | Hellstron | Feb. 16, 1937 |
| 2,113,178 | Gase | Apr. 5, 1938 |
| 2,411,209 | Hall | Nov. 19, 1946 |

FOREIGN PATENTS

| | | |
|---|---|---|
| 2,890 | Great Britain | Feb. 4, 1913 |
| 485,867 | Germany | Nov. 8, 1929 |
| 782,879 | France | Mar. 25, 1935 |
| 848,143 | Germany | Sept. 1, 1952 |